US005115105A

United States Patent [19]

Gallusser et al.

[11] Patent Number: 5,115,105

[45] Date of Patent: May 19, 1992

[54] OVERBRAIDED IN-LINE DATA BUS LOOM

[75] Inventors: David O. Gallusser, Oneonta; James B. LeBaron, Sidney, both of N.Y.

[73] Assignee: Amphenol Corporation, Wallingford, Conn.

[21] Appl. No.: 482,707

[22] Filed: Feb. 21, 1990

[51] Int. Cl.⁵ ........................ H01B 7/34; H02G 15/18

[52] U.S. Cl. .................................. 174/36; 174/35 C; 174/71 R; 174/88 C; 333/24 R

[58] Field of Search ..................... 174/35 C, 36, 71 R, 174/72 R, 88 R, 88 C, DIG. 8; 333/24 R, 112, 119

[56] References Cited

U.S. PATENT DOCUMENTS

| | | | |
|---|---|---|---|
| 2,344,635 | 3/1944 | Priestly | 174/107 |
| 2,590,821 | 3/1952 | Kiser | 361/398 |
| 3,601,783 | 8/1971 | Loose | 439/885 X |
| 4,246,438 | 1/1981 | Gozian | 174/880 |
| 4,273,953 | 6/1981 | Guzy | 174/DIG. 8 |
| 4,489,217 | 12/1984 | Klopfer | 174/356 |
| 4,500,371 | 2/1985 | De Groot | 174/DIG. 8 |
| 4,549,039 | 10/1985 | Charlebois et al. | 174/88 R |
| 4,586,970 | 5/1986 | Ishise et al. | 174/DIG. 8 |
| 4,589,939 | 5/1986 | Mohebban et al. | 174/88 R X |
| 4,749,822 | 6/1988 | Klein | 174/36 |
| 4,755,241 | 7/1988 | Steinberg | 174/DIG. 8 |
| 4,823,364 | 4/1989 | Herzog | 333/20 X |
| 4,852,252 | 8/1989 | Ayer | 174/88 C |
| 4,998,079 | 3/1991 | Theall, Jr. | 333/112 |

*Primary Examiner*—Morris H. Nimmo
*Attorney, Agent, or Firm*—Bacon & Thomas

[57] ABSTRACT

An arrangement for shielding a date bus coupler includes an overbraided shield electrically connected to each of the outer braids of the bus cables coupled by the coupler. The overbraided shield prevents shielding discontinuities at the terminations of the cables to the coupler.

25 Claims, 4 Drawing Sheets

FIG. 1(a)
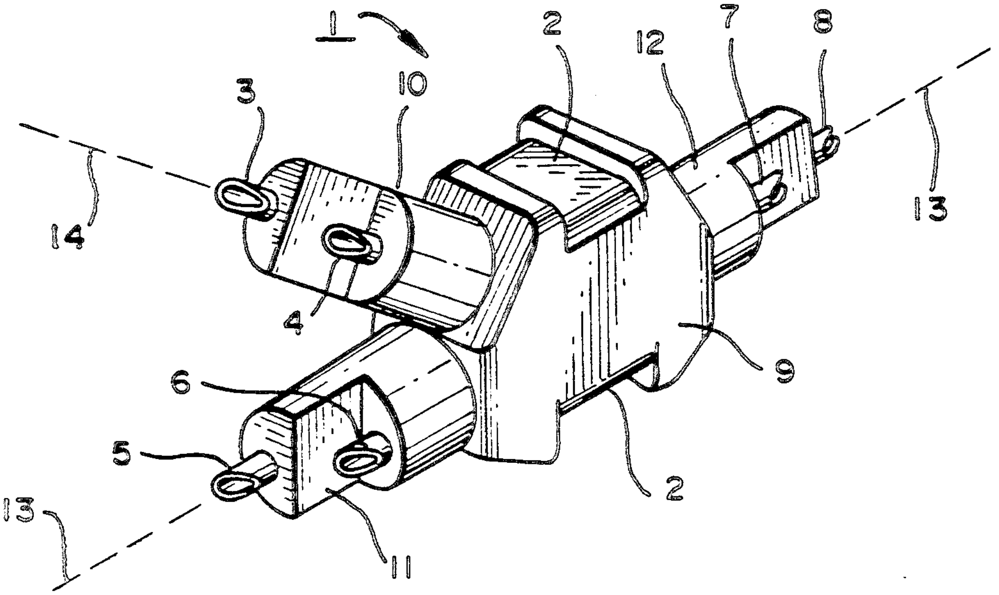
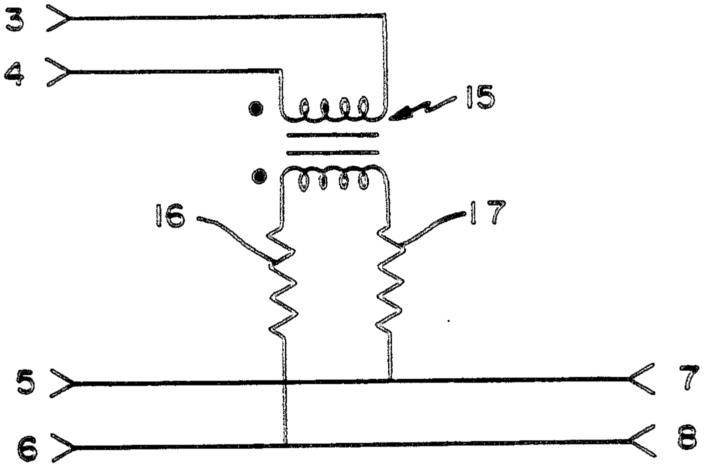
FIG. 1(b)

FIG. 2(a)
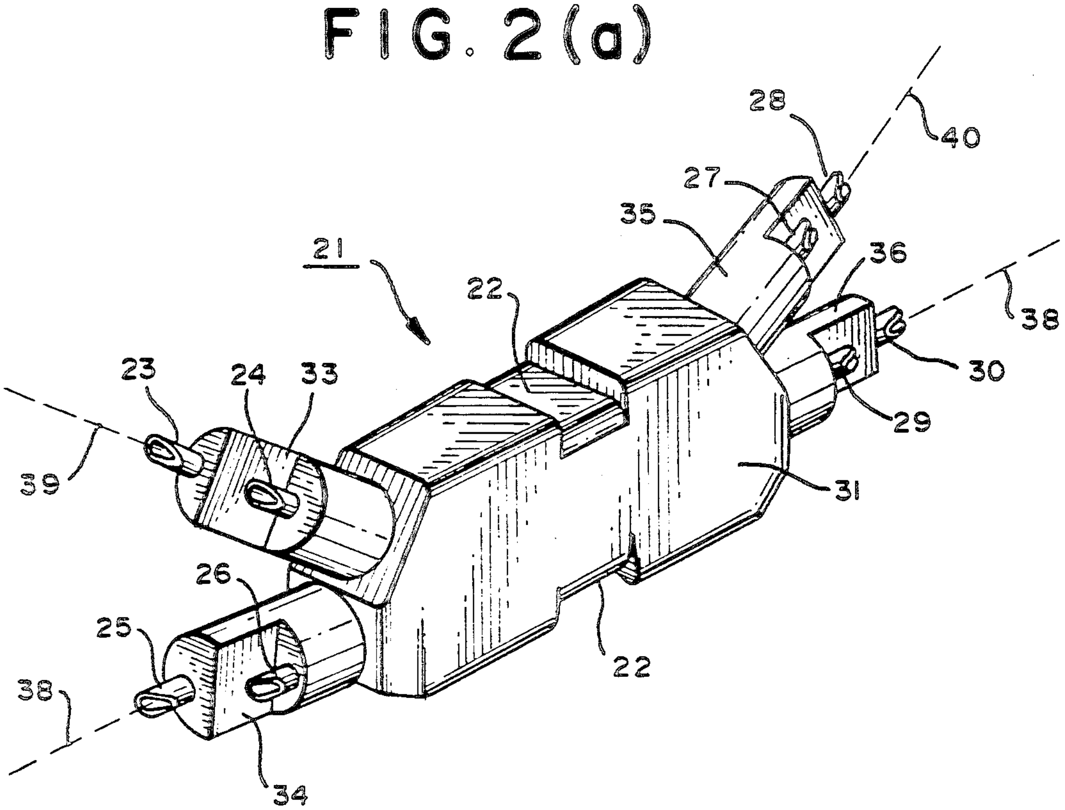
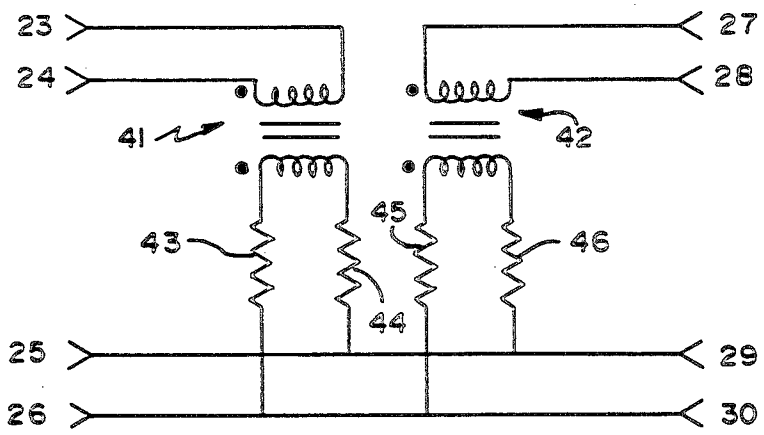
FIG. 2(b)

OVERBRAIDED IN-LINE DATA BUS LOOM

BACKGROUND OF THE INVENTION

I. Field of the Invention

This invention relates to the field of electrical cable coupling and shielding, and in particular to a continuous uninterrupted cable shield for a data bus loom.

II. Description of Related Art

Data bus couplers are known which permit coupling of high frequency data buses via a transformer and impedance matching resistors. In order to protect the integrity of the data transmitted along the cables, it is essential that the individual conductors of each cable be shielded from high frequency electromagnetic interference.

Conventionally, data bus cables are shielded by a metallic outer braid. This braid provides excellent protection from interference. However, at the point where the individual conductors are attached to the coupler, shielding discontinuities may be present.

In order to overcome the problem of shielding discontinuities at data bus conductor terminations and also at cable joints in general, rigid metallic casings for the couplings have been provided. The casings are soldered or otherwise electrically connected to the cable braids and provide a measure of shielding continuity. However, such casings suffer the disadvantages of relatively high cost and large size. In addition, they are relatively difficult to assemble.

Therefore, a need exists for a continuous cable shield for cable couplers and joints which solves the problem of leakage due to shield discontinuity, and yet is compact and simple to assemble.

SUMMARY OF THE INVENTION

It is an object of the invention to overcome the drawbacks of the prior art by providing a continuous shield for preventing electromagnetic interference (EMI) leakage at a cable coupling.

It is a further object of the invention to provide such a continuous EMI shield for a data bus coupler and a data bus coupler adapted for the provision of such a continuous EMI shield.

It is a still further object of the invention to provide an environmentally sealed data bus loom having a continuous EMI shield.

Finally, it is an object of the invention to provide a method of assembling a cable coupling, and in particular a data bus loom, having a continuous EMI shield.

These objects are accomplished according to a preferred embodiment of the invention by providing a data bus coupler which is overbraided to provide a continuous uninterrupted shield over the entire coupler. Overbraiding both provides an effective EMI shield and reduces the size of the coupler loom. In addition, by first terminating the data bus cables to the coupler and subsequently providing a continuous shield which completely encloses both the coupler and the terminations, assembly is greatly simplified.

BRIEF DESCRIPTION OF THE DRAWING

FIG. 1(*a*) is a perspective view of a single stub data bus coupler.

FIG. 1(*b*) is a circuit diagram showing an electrical circuit for the data bus coupler of FIG. 1(*a*).

FIG. 2(*a*) is a perspective view of a double stub data bus coupler.

FIG. 2(*b*) is a circuit diagram showing an electrical circuit for the data bus coupler of FIG. 2(*a*).

DETAILED DESCRIPTION OF THE PREFERRED EMBODIMENTS

Figure 3:
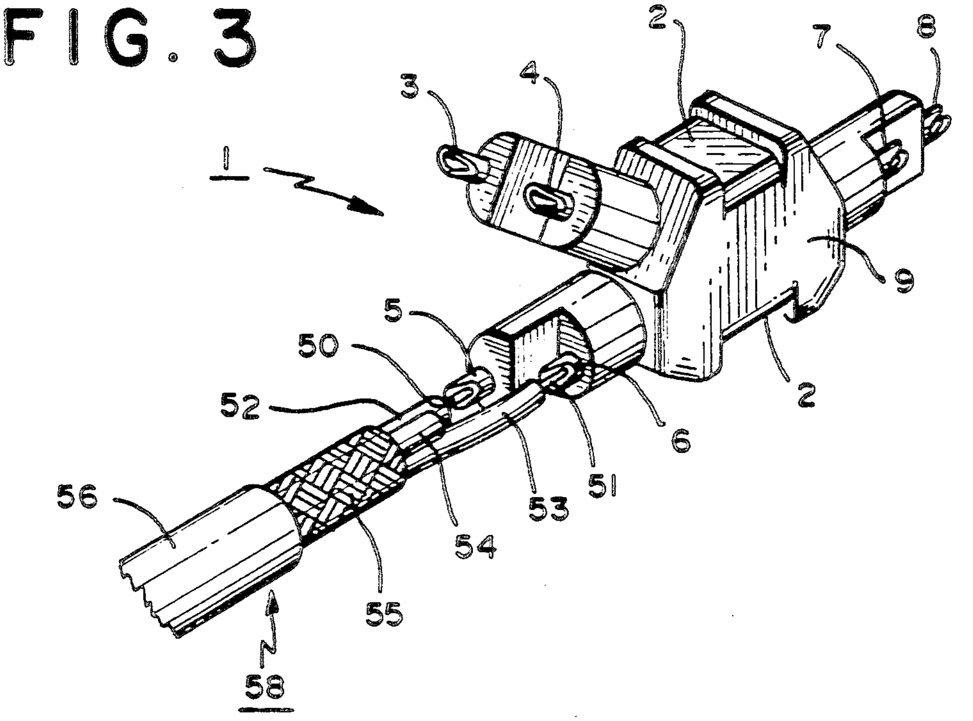
FIG. 3 illustrates the manner in which a shielded cable is connected to the single stub data bus coupler of FIG. 1(*a*).

FIG. 1(*a*) is a perspective view of a single stub data bus coupler 1. Data bus coupler 1 includes bus-in terminal 11 from which wire terminations 5 and 6 project. Bus-out terminal 12 is located along the same axis 13 as bus-in terminal 11 and includes wire terminations 7 and 9.

Data bus coupler 1 further includes a housing 9 from which a stub terminal 10 including wire terminations 3 and 4 projects in a direction parallel to an axis 14. Axis 14 intersects axis 13 at a non-zero angle in a "y" configuration which facilitates the overbraidiang to be described below. The data bus coupler further includes an optional strap mounting groove 2 which may be used to seat a mounting strap (not shown) for tying down the coupler.

Wire terminations 3–8 are depicted as solder type terminations, although it will be appreciated by those skilled in the art that other types of terminations may also be used with coupler 1, including wire wrap and butt joint terminations.

As illustrated in the circuit diagram of FIG. 1(*b*), wire terminations 3–8 are connected to each other via a transformer circuit inside within housing 9 of the data bus coupler 1. Wire terminations 3 and 4 are wired to one coil of a transformer 15, while terminations 5–8 are connected to a second coil of transformer 15 via isolation resistors 16 and 17. This type of connection is known in the data bus coupler art and therefore the number of coils and the value of the resistors would be readily determinable by those skilled in the art.

The double stub data bus coupler shown in FIG. 2(*a*) includes essentially the same elements as data bus coupler 1. Data bus coupler 21 includes a bus-in terminal 34, a bus-out terminal 36, and two stub terminals 33 and 35. The terminals 33–36 each include two of wire terminations 23–30, respectively as shown. The bus-in and bus-out terminals are aligned along an axis 38 and the stub terminals 33 and 35 extend at a non-zero angle along axes 39 and 40 from a main housing 31, which also includes an optional strap mounting groove 22.

FIG. 2(*b*) shows an example of the manner in which the branch cables connected to stub terminations may be coupled to the two parts (bus-in and bus-out) of the main data bus cable via transformers 41 and 42 and isolation resistors 43–46.

Those skilled in the art will appreciate that the data bus coupler shown in FIGS. 1(*a*) and 2(*a*) may include numerous modifications of the illustrated structures and that the invention is intended to apply to cable couplings and joints other than data bus couplers. For example, the stub terminals may extend at any angle from approximately 0° to 180° in respect to the main bus axis. Also, the bus-in and bus-out terminals need not be aligned along the same axis. Finally, it will be appreciated that the coupler may include any number of stub terminals and that circuit arrangements other than the transformer circuits shown in FIGS. 1(*b*) and 2(*b*) may be used to connect the main data bus with the stub terminals.

Data bus coupler 1 is joined to a cable by terminating the individual wires 50 and 51 of cable 58 to corresponding wire terminations 5 and 6, as shown in FIG. 3. Individual wires 50 and 51, which may be solid or stranded and twisted together, are dielectrically shielded by insulating coverings 52 and 53. Cable 58 also includes filler cord 54, a braided shield 55, and an outer jacket 56. Before termination, the twisted pairs of wires are exposed by stripping back braided shield 55 and outer jacket 56. A portion of the wire braid is left exposed by stripping back the outer jacket further than the braided shield.

Figure 4:
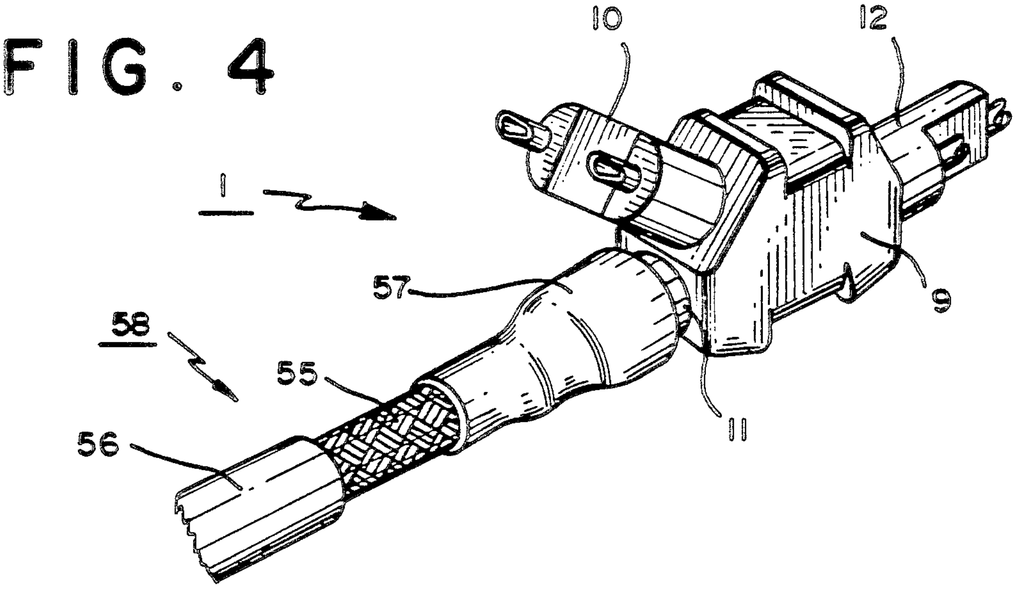
FIG. 4 shows the coupling arrangement of FIG. 3, with the addition of an insulated cover.

As shown in FIG. 4, the exposed wires 5 and 6 are electrically insulated by providing an insulated cover 57. Cover 57 may be in the form of shrink tubing, or any other suitable dielectric material for providing electrical isolation of the wires.

Figure 5:
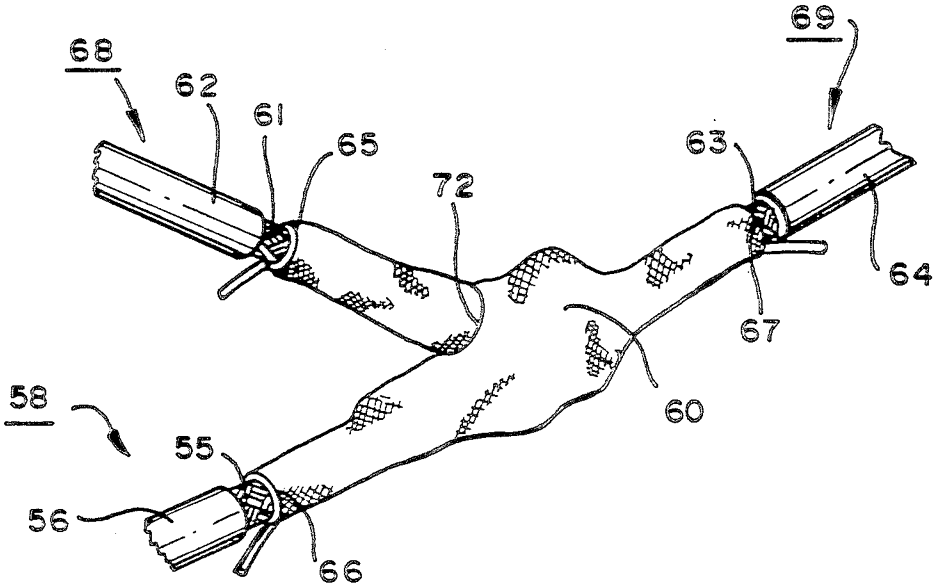
FIG. 5 is a perspective view of a coupler overbraid for the single stub data bus coupler arrangement of FIG. 4.

When the bus-in cable 58, a bus-out cable 69, and a stub terminal cable 68 have all been connected to the data bus coupler in the manner shown in FIG. 5, respective shields 55, 63, and 61 of the three cables are then electrically connected by an overbraided shield 60.

In order to facilitate assembly, overbraid 60 may be formed in two parts and joined along a seam 72 or formed in more than two parts and joined by one or more seams. In addition, it will be appreciated that the seams may overlap and that the overbraid may have numerous configurations other than the specific embodiment illustrated in FIG. 5.

Overbraid 60 may be electrically connected to the three respective cable shields by any of a variety of suitable electrical connection or bonding methods, including soldering and weaving the ends of the overbraid into the braided shields of the cables. Other electrical connection methods will also occur to those skilled in the art. Each of electrical bonds 65-67 should extend 360 degrees around its respective cable, however, to ensure complete electrical continuity of the shield.

By providing overbraided shield 60 instead of a rigid casing, assembly is greatly simplified due to ease of manipulating the braiding and the greater dimensional tolerances involved. Nevertheless, the overbraided shield provides completely continuous shielding of all cable terminations.

Furthermore, the advantages provided by the assembly method of first terminating the wires of the data busses to the coupler and then applying a conductive shield continuation may also be obtained by substituting for the overbraid shown in FIG. 5 various similar conductive materials which may be electrically connected to the cable shields by 360 degree connections. These include pressed-over metal, metal foil wrap, and vapor deposited conductive materials.

Figure 6:
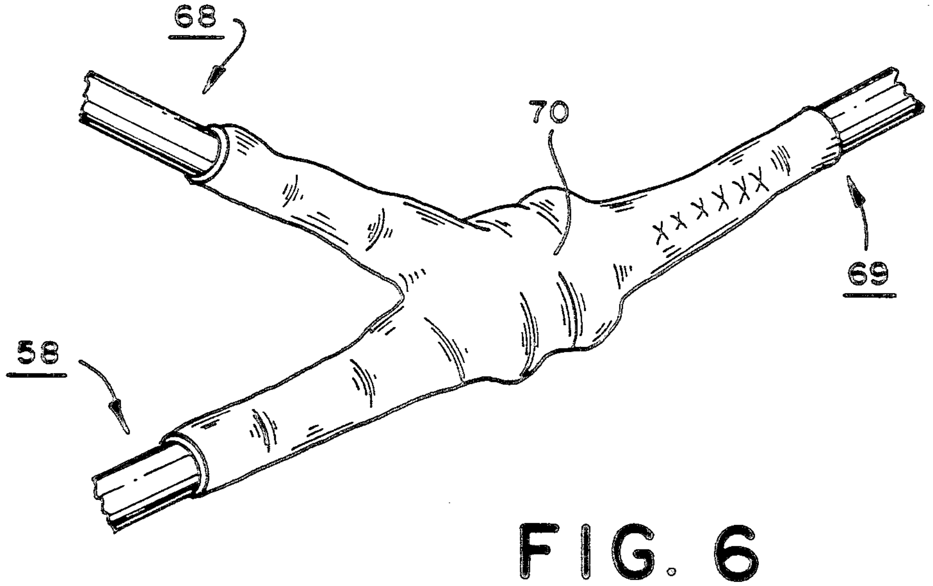
FIG. 6 is a perspective view of the shielded data bus coupler of FIG. 5, further including an insulating cover.

The completed assembly is shown in FIG. 6. After the overbraid has been applied, an environmental seal 70 may easily be applied, including bond seals between outer seal 70 and the respective outer jackets of cables 58, 68, and 69 in order to protect the EMI shielded assembly from moisture, dust, and other environmental contaminants, as is known in the art. Outer seal 70 may be applied by any of a variety of known methods such as plasticoat dipping, conformal coating, overmolding, wrapping, seam welding and so forth.

As indicated above, it will be recognized by those skilled in the art that the foregoing description of the invention is not intended to limit the invention to the precise form disclosed, and that other modifications and variations will be possible in light of the above teachings. It is therefore intended that the appended claims be construed to include all alternative embodiments and modifications of the invention except in so fas as they are limited by the prior art.

We claim:

1. An assembly for shielding a data bus coupler, comprising:

a conductive shield continuation including means electrically connecting a braided shield of a branch cable to a braided shield of each of two parts of a main cable, said branch cable and said main cable being electrically coupled by a data bus coupler, in order to provide a continuous uninterrupted EMI shield for the coupler, said conductive shield continuation completely enclosing said coupler.

2. An assembly as claimed in claim 1, wherein said conductive shield continuation is an overbraided shield.

3. An assembly as claimed in claim 2, wherein electrical connections between said overbraided shield and said shields extend 360° around a circumference of said branch cable and each of said main cable parts.

4. An assembly as claimed in claim 2, wherein each of said branch and main cables includes an insulating outer jacket which covers a respective braided shield, and wherein said insulating outer jacket at an end of each of said cables is stripped to expose said respective braided shield and thereby permit connection between said respective braided shield and said overbraided shield.

5. An assembly as claimed in claim 2, wherein said branch cable and each of said main cable parts carries a plurality of individual wires terminated to said coupler by individual terminations.

6. An assembly as claimed in claim 5, further comprising at least a second branch cable.

7. An assembly as claimed in claim 5, wherein at least one of said terminations between said coupler and said individual wires are enclosed in an insulating jacket.

8. An assembly as claimed in claim 2, wherein said branch cable and said main cable each includes an insulating outer jacket, said assembly further comprising an environmental seal enveloping said braided shield and bonded to said insulating outer jackets.

9. An assembly as claimed in claim 8, wherein said bonding between said environmental seal and said insulating outer jackets extends 360° around said branch cable and each of said main cable parts to completely seal said assembly against environmental contaminants.

10. An assembly as claimed in claim 2, wherein terminations for individual wires of the branch cable are electrically connected to terminations for individual wires of said main cable by a transformer circuit.

11. An assembly as claimed in claim 2, wherein said data bus coupler is a single stub in-line data bus coupler.

12. An assembly as claimed in claim 2, wherein said data bus coupler is a double stub in-line data bus coupler.

13. An assembly for providing a continuous uninterrupted EMI shield between braided outer shields of at least two cables, each cable carrying a plurality of individual wires which are surrounded by a respective said braided shield, comprising:

data bus coupler means for electrically connecting the respective individual wires of at least two cables;

a conductive shield continuation which completely enclosed said coupler means:

means for electrically connecting said conductive shield continuation to each of said braided outer shields to form a continuous uninterrupted shield between said braided outer shields.

14. An assembly as claimed in claim 13, wherein said conductive shield continuation is an overbraided shield.

15. A method of providing a continuous uninterrupted EMI shield connecting braided outer shields of at least two cables, comprising the steps of:

(a) electrically connecting respective individual wires of at least two cables, each cable surrounded by a braided shield, to a data bus coupler, one of said cables having two parts connected respectively to different terminations on said coupler, a second cable being a branch cable connected to a third termination on said coupler;

(b) subsequently enclosing the resulting connections within an overbraided shield which completely encloses the coupler;

(c) electrically connecting the overbraided shield of braided outer shields to form a continuous uninterrupted shield between said braided outer shields.

16. A method as claimed in claim 15, wherein step (a) comprises the step of terminating respective individual wires of said cables to terminations provided on a coupler.

17. A method as claimed in claim 15, further comprising the step of enclosing at least one of said terminations within an insulating jacket.

18. A method as claimed in claim 15, wherein step (c) comprises the step of extending said electrical connections around the circumference of each of said cables.

19. A method as claimed in claim 15, further comprising the step of stripping an outer jacket of each of said cables, said outer jackets otherwise enclosing said braided outer shields prior to step (c) in order to facilitate electrical connection of the overbraided shield to the braided outer shields.

20. A method as claimed in claim 19, further comprising the step of environmentally sealing the shielded electrical connections by enclosing them within an environmental shield bonded to the outer jackets of each said cables.

21. A method as claimed in claim 20, wherein the step of environmental sealing comprises the step of bonding said environmental shield around the circumference of each of said cables.

22. A method as claimed in claim 21, wherein step (a) comprises the step of terminating respective individual wires of said cables to terminations provided on a data bus coupler.

23. A method as claimed in claim 14, wherein step (a) comprises the step of terminating respective individual wires of said cables to terminations provided on a coupler having a plurality of stub terminations.

24. A data bus coupler for coupling at least three cables, each cable including a braided shield, comprising:

a plurality of stub terminals, each including means for electrically terminating one of three cables thereto and adapted to be completely enclosed by an overbraided shield electrically connected to braided shields of each of said cables.

25. A data bus coupler as claimed in claim 24, wherein said stub terminals are oriented at an acute angle in respect to a principal axis of said coupler in order to facilitate enclosure by the overbraided shield.

* * * * *